United States Patent [19]
Scott, Jr.

[11] 3,753,386
[45] Aug. 21, 1973

[54] VALVE ACTUATOR
[76] Inventor: Floyd L. Scott, Jr., 7922 Westglen Dr., Houston, Tex.
[22] Filed: Mar. 3, 1971
[21] Appl. No.: 120,585

[52] U.S. Cl. .................................. 92/5, 92/138
[51] Int. Cl. ..... F01b 9/00, F01b 25/26, F01b 31/12
[58] Field of Search .................... 92/31, 33, 5, 138; 74/55, 56, 89, 104, 107; 251/25 D, 58; 123/56 C

[56] References Cited
UNITED STATES PATENTS

| | | | |
|---|---|---|---|
| 2,229,545 | 1/1941 | Beckstrom | 123/56 C |
| 3,610,568 | 10/1971 | Duwe | 251/58 |
| 2,998,805 | 9/1961 | Usab | 92/33 |
| 1,572,068 | 2/1926 | Gould | 92/31 |
| 2,883,144 | 4/1959 | Kendig | 92/31 X |
| 2,401,466 | 6/1946 | Davis | 74/56 X |
| 3,143,932 | 8/1964 | Lanman | 92/31 |
| 3,198,539 | 8/1965 | McMullen | 280/43.17 |
| 3,274,901 | 9/1966 | Yost | 92/31 |
| 3,338,140 | 8/1967 | Sheesley | 92/5 |
| 3,513,713 | 5/1970 | Schumacher | 74/55 |

FOREIGN PATENTS OR APPLICATIONS
487,469   4/1918   France ................. 92/138

Primary Examiner—Irwin G. Cohen
Attorney—Jack W. Hayden

[57] ABSTRACT

Spaced, single acting piston means are mounted for reciprocation within a housing, such pistons having interconnected therebetween and movable therewith a carrier means having cam surface means thereon. Fixed, rotatable bearing means are interposed between the housing and cam surface carrier to facilitate reciprocation of the cam surface carrier means within the housing in which it is supported.

A cam follower means is provided for abutting the cam surface in the carrier, and crank means is connected therewith and is provided with means for connecting to a valve stem so that reciprocation of said cam surface carrier means in the housing causes the cam follower to move along said cam surface means and impart rotation to the crank arm means and the valve stem connected therewith. An indicator is connected with the cam follower to indicate externally of the housing the open or closed condition of the valve.

1 Claim, 6 Drawing Figures

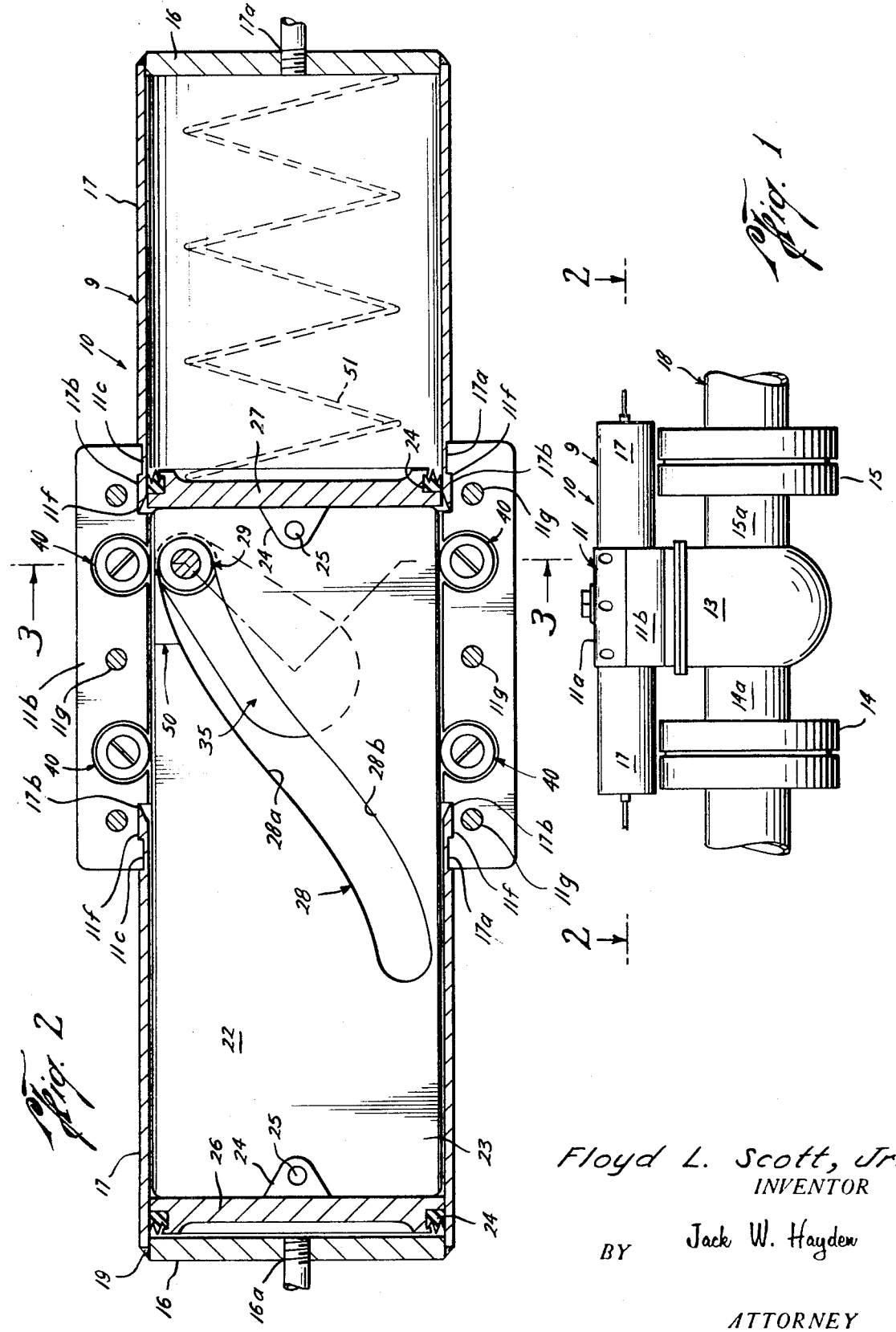

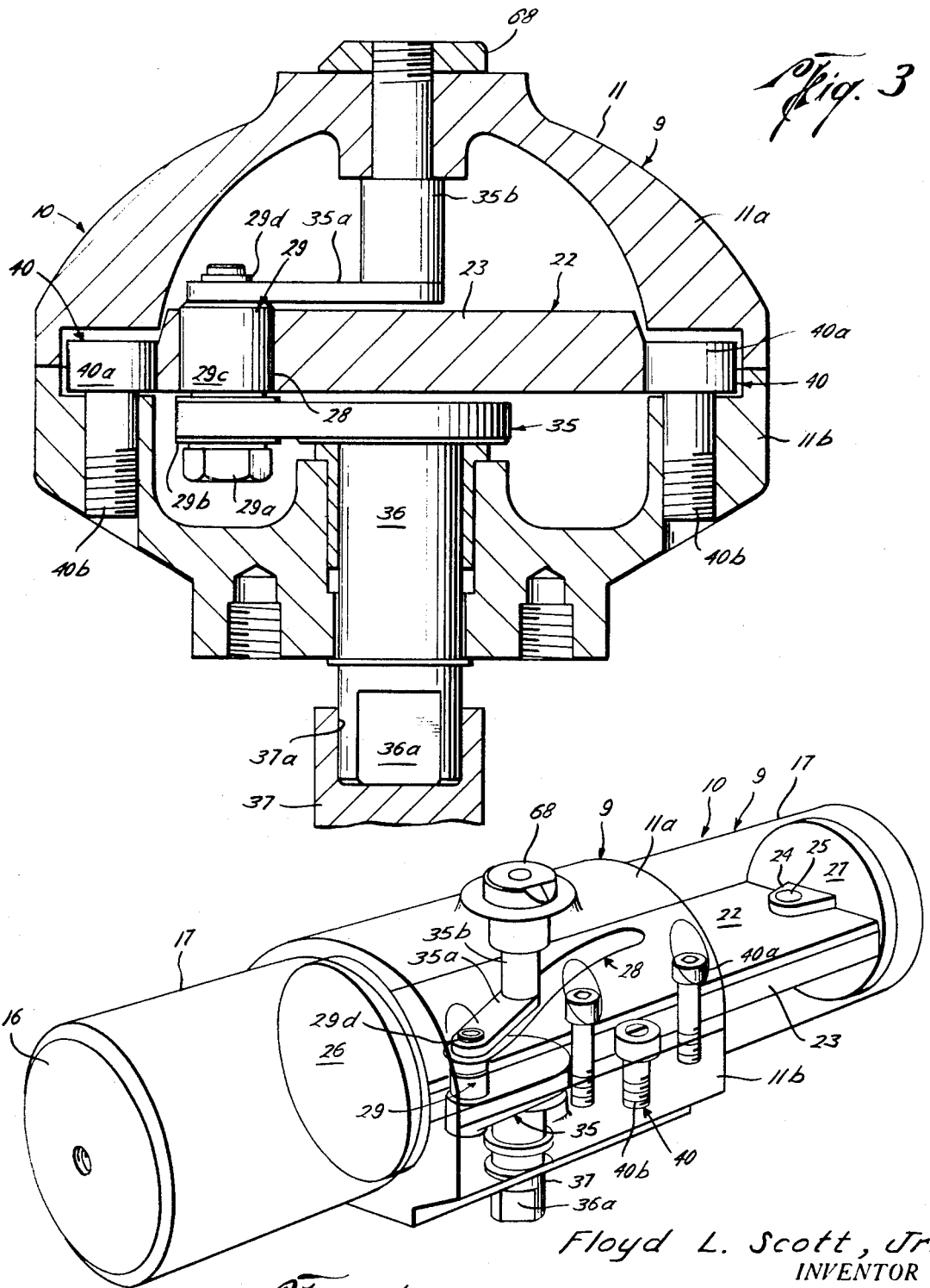

PATENTED AUG 21 1973

Floyd L. Scott, Jr.
INVENTOR

BY Jack W. Hayden

ATTORNEY

VALVE ACTUATOR

BACKGROUND OF THE INVENTION

The field of the present invention relates to the valve actuator, and more particularly, a valve actuator for a ball, plug, or other rotatable type valve. Various devices have been proposed in the prior art and are in use at the present time for translating linear movement of a valve actuator into rotary movement of a valve stem to move the valve to open or closed position. A number of the devices in use employ the scotch yoke, or a pin engaged between spaced projections, or a pin engaged in a helical slot.

Some of the prior art references which show such constructions include the U.S. Pat. to R. W. Lanman, No. 3,143,932, issued on Aug. 11, 1964; the U.S. Pat. to J. M. Sheesley, No. 3,146,681, issued on Sept. 1, 1964; the U.S. Pat. to H. Ledeen et al., No. 3,261,266, issued on July 19, 1966; and the U.S. Pat. to W. E. Heese, No. 3,152,520, issued on Oct. 13, 1964. In these devices, a substantial portion of the energy of the actuator may be lost in the internal friction between the relatively movable parts. Additionally, a helical type slot provides the same angle throughout the entire length of the slot. Such construction may give rise to undesirable characteristics in the starting and ending torque of the valve actuator.

SUMMARY OF THE INVENTION

The present invention is directed to a relatively simple valve actuator construction which overcomes the above and other problems associated with the prior art.

Still another object of the present invention is to provide a valve actuator including housing means in which is supported movable piston means having a carrier means extending therebetween in which is formed cam surface means for engaging with a cam follower upon movement of the carrier within the housing which, in turn, rotates a crank arm which is provided with means for connection with a valve stem for rotation of the valve stem.

Yet a further object of the present invention is to provide a valve actuator incorporating a thin wedge which is adapted to be pushed between a plurality of rollers by a pressure force, some of the rollers being fixed, but rotatable, for supporting lateral thrust loads and spaced from other roller means which is attached to a crank for rotation thereof and for rotation of the valve stem adapted to be connected therewith when the wedge is moved in the space between the rollers.

Still another object of the present invention is to provide a reciprocating valve actuator which is adapted to be moved laterally relative to the valve for rotation of the stem to open and close the valve, the valve actuator including carrier means having a cam surface arrangement formed thereon and a housing for supporting the carrier, there being rotatable bearing means for accommodating relative movement between the carrier and the housing and a cam follower for engaging with the cam surface formed in the carrier to impart rotation to a crank and a valve stem adapted to be connected therewith upon movement of the carrier in the housing.

Yet a further object of the present invention is to provide a valve actuator of relatively simple construction which substantially reduces the friction between the moving parts so that a greater amount of the energy input to the torque actuator is available for rotating a valve stem.

Still another object of the present invention is to provide a compact valve actuator for rotating a valve stem to open and close a valve which is constructed and arranged to provide high starting and high ending torque.

Yet a further object of the present invention is to provide a valve actuator incorporating a cam surface formed in a carrier, the carrier being supported by bearing means in a housing for relative movement between the housing and the carrier.

Still a further object of the invention is to provide a valve actuator incorporating a cam surface formed in a carrier, the carrier being supported by bearing means in a housing for relative movement between the housing and the carrier, the carrier having piston means at each end thereof so that fluid pressure may be applied thereto for movement of the carrier.

Yet a further object of the present invention is to provide a valve actuator incorporating a cam surface formed in a carrier, the carrier being supported by bearing means in a housing for relative movement between the housing and the carrier incorporating barrier means so that a pressure force may be exterted thereagainst for movement of the carrier whereupon a cam follower moves along the cam surface to rotate a crank and a valve stem connected therewith.

Still another object of the present invention is to provide a valve actuator incorporating a cam surface formed in a carrier, the carrier being supported by bearing means in a housing for relative movement between the housing and the carrier incorporating barrier means so that a pressure force may be exerted thereagainst for movement of the carrier whereupon a cam follower moves along the cam surface to rotate a crank and a valve stem connected therewith and indicator means for indicating the position of the cam follower relative to the cam surface as an indication of open or closed position of the valve.

BRIEF DESCRIPTION OF THE DRAWINGS

FIG. 1 is a side elevation illustrating the valve actuator of the present invention connected with a valve in a conduit;

FIG. 2 is a sectional view, partly in elevation, on the line 2—2 of FIG. 1 illustrating structural details of the present invention;

FIG. 3 is a sectional view on the line 3—3 of FIG. 2, partly in elevation, illustrating still further structural details of the present invention;

FIG. 4 is a perspective view illustrating the relationship of some of the components of the valve actuator of the present invention;

DESCRIPTION OF THE PREFERRED EMBODIMENTS

Figure 5:
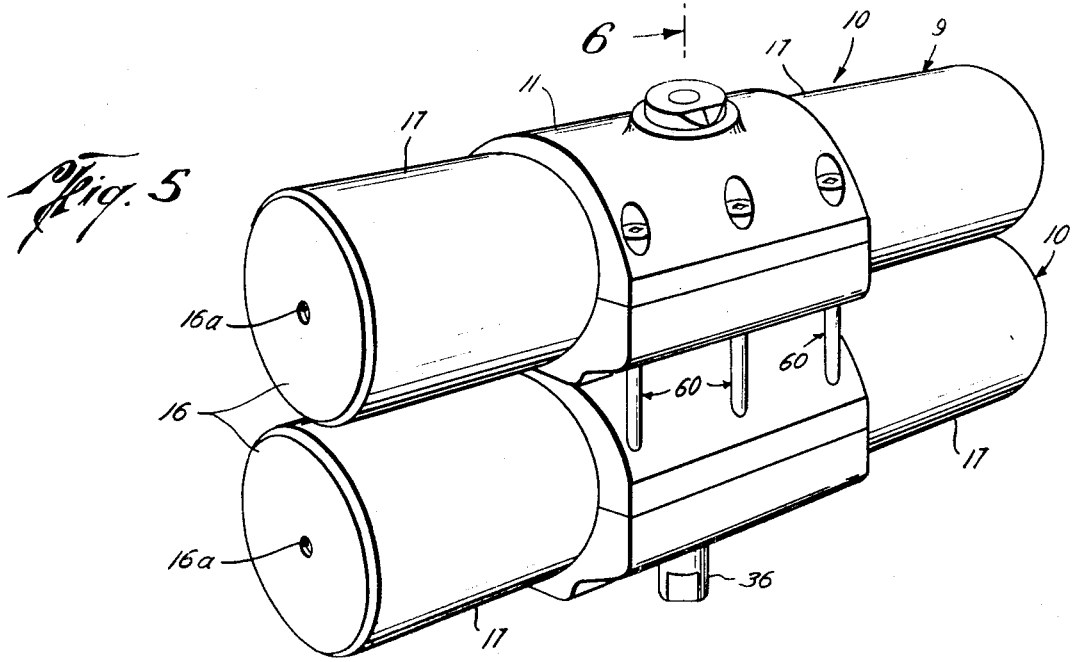
FIG. 5 is a perspective elevation showing an arrangement of the present invention for providing an additional torque required.

Attention is first directed to FIG. 1 of the drawings wherein the invention is referred to generally by the numeral 10 and is shown as including housing means 9 which is mounted in any suitable manner on the valve housing 13. The valve housing 13 is shown as having the flanges 14 and 15 connected therewith by the conduits 14a and 15a whereby the valve may be removably positioned in the flow conduit referred to generally by the numeral 18.

The housing 9 in the form of the invention shown and described herein has cylindrical portions 17 carried on the center portion 11 and the cylindrical portions 17 each have end closure plates 16 which are secured by any suitable means such as welding 19 or the like to the cylindrical end portions 17 of the housing 9. Carrier means 22 in the form of a plate-like member 23 is provided within the housing 9 and is connected by any suitable means such as the brackets 24 and pins 25 to the pistons 26 and 27 at each end thereof. The pistons 26 and 27 are of a suitable diameter for fitting within the cylindrical housing portions 17 and are provided with seal means 24 for sealing therebetween.

The carrier means 22 is provided with cam surface means referred to generally at 28, and a cam follower means referred to generally by the numeral 29 is provided for abutting the cam surface means upon reciprocation of the carrier means 22 and within the cylindrical portions 17 of the housing 9.

The cam follower means 29 is connected with the crank arm means 35, and the crank arm means 35, as more clearly shown in FIG. 3 of the drawings has secured thereto the stem 36 which is adapted to be connected with a valve stem 37 for imparting rotation thereto, as will be described in greater detail hereinafter.

Suitable bearing means as referred to generally by the numeral 40 are provided to support the carrier means 22 and absorb lateral thrust thereof during reciprocation within the housing 9.

The housing 9 may be constructed in any suitable manner, but as shown in the drawings, the cylindrical portions 17 are provided with circumferentially extending grooves 17a adjacent but spaced from each end thereof to thereby provide the circumferentially extending projections 17b. The central portion of the housing 9 may be referred to generally by the numeral 11 and includes hollow portions 11a and 11b having a cylindrical bore 11c extending partially in each end thereof. A circumferential groove 11f is formed adjacent, but spaced from, the end of the cylindrical bore 11c and the projections 17b of each of the cylindrical portions 17 is adapted to fit therein. Thus, when the two portions 11a and 11b are clamped around the ends of the cylindrical portions 17 as illustrated in FIG. 2 of the drawings, the cylindrical portions 17 and the two hollow central portions 11a and 11b fit together to form an integral housing 10. Any suitable means such as the bolts 11g secured through the portions 11a and 11b may be provided for locking the portions 11a and 11b together and in engagement with each of the cylindrical portions 17 to form the housing 9.

Of course, the cam follower 29, the carrier means 22, and pistons 26 and 27 will be assembled to fit within the portions 11a and 11b before the portions 11a and 11b are secured together with housing portions 17 by the bolts 11g.

The cam surface means 28 is illustrated in the drawings as being in the form of a slot 28a of the lazy S type which in the preferred form comprises mutually tangent circular arcs to provide desired starting and ending torque characteristics in the valve actuator as will be described. In some situations, where the valve is to be moved in only one direction, it can be appreciated that the cam surface means 28 may be in the form of a half slot only so that only one cam surface is provided in the valve actuator.

As better seen in FIG. 3, the cam follower 29 includes a bolt 29a carrying rotatable bearing means 29b positioned within an opening in the end of crank arm 35. Rotatable means 29c are provided on bolt 29a for riding against the cam surface means 28, and rotatable means 29d are provided for fitting around the upper end of the bolt 29a and engaging within an opening in the crank arm 35a for a purpose to be described.

As shown in the drawings, the bearing means 40 comprise a plurality of rotatable members 40a that are carried on the threaded shafts 40b within the housing portions 11a and 11b as more clearly illustrated in FIG. 3 of the drawings. It will be noted that the bearing means 40 are arranged within the central portion 11 of the housing 9 to engage the plate-like member 23 on each side at spaced intervals therealong to absorb lateral thrust of the plate 23 during reciprocation of the plate-like member 23 within the housing 10.

The crank arm 35 is integrally formed with a shaft 36, and the shaft 36 is provided with noncircular portions 36a which engage with similar noncircular portions (not shown) in the opening 37a in the valve stem 37 so that rotation of the shaft 36 is transmitted to the valve stem 37.

It will be noted that the end plates 16 are provided with fluid pressure inlets 16a and 17a, respectively, so that suitable fluid pressure may be conducted internally of the cylindrical portions 17 to act upon the pistons 26 or 27 and move them and the carrier means 22 longitudinally of the housing 9.

For example, when the actuator is in the position as illustrated in FIG. 2 and fluid pressure is conducted through the inlet 16a to act on the piston means 26 and pressure relieved from the right-hand side of the piston 27, the carrier means 22 will be forced longitudinally of the housing 9 whereupon the cam follower 29 will move along the cam surface 28 and cause the crank to rotate in a counterclockwise direction as viewed from the top in FIG. 2 of the drawings. When this occurs, the shaft 36 connected with the crank arm 35 will rotate and transmit such rotation to the valve stem 37.

Likewise, when the cam follower 29 is in the position shown in FIG. 4 of the drawings and pressure is supplied to act upon the piston 27 in a manner to reciprocate the carrier means 22 in housing 9 to the left as viewed in FIG. 4 so that the crank arm 35 moves in a clockwise direction as does the shaft 36 and valve stem 37.

Some valve constructions require an extra force at the beginning and at the end of the movable closed element movement to either rotate the valve seat or to wipe the valve seat with closure element or to bring the seat into tighter contact with the closure element.

Additionally, for some reasons because of misalignment, or for other reasons, any valve is subject to the problem of being more difficult to move towards opening or closing position in the last ten to fifteen degrees of travel.

It will be noted that the cam surface 28 of the present invention has different angles at different portions thereof. For examle, the starting angle of the cam surface 28 may vary anywhere from 0° up to approximately one-half of the central angle of the cam surface 28. Similarly, the minimum central angle of the cam surface 28 should approximate 15°. And while the most preferred ratio between the center angle and the starting angle of the cam surface 28 is approximately four to one, this may be varied depending upon the characteristics of the valve with which the present actuator is to be employed. This, of course, determines the configuration of the cam surface 28. Thus, the present invention provides an actuator for a valve wherein the desired starting and ending torque as well as intermediate torque between opening and closing of the valve may be incorporated in the valve actuator with a minimum of effort to meet the torque requirement of the valve with which the actuator is to be used.

The cam surface 28 of the present invention may be considered as being formed of an infinite number of wedges, one of which is diagrammatically represented at 50 in FIG. 2 of drawings. As the carrier 22 moves, the thin wedge represented diagrammatically at 50 starts to move in the space between the rotatable, but fixed, bearings or rollers 40 which are adjacent but spaced from the traveling roller represented by the cam follower 29, and this movement displaces the movable roller, or cam follower, 29 that is attached to the crank arm 35, and the crank arm 35 is thereby forced to rotate, and this rotates shaft 36. Similarly, since the balance of the cam surface 28 may be considered an infinite number of wedge surfaces arranged in juxtaposition so that the resulting surface 28a as well as the surface 28b is continuous and smooth, and continued movement of the carrier 22 will force the cam follower 29 along cam surface 28 in a manner to avoid a bumpy, jerky operation of the valve actuator.

If desired, external adjustable stops may be provided on the end plates 16 and 17 to limit rotation of the valve stem.

Additionally, as illustrated in dotted line at 51 of FIG. 2, suitable spring means may be employed to act against one of the piston means so that if fluid pressure to the valve operator should fail, the spring will function to automatically move the operator so as to always position the valve in closed position, under some conditions. In lieu of a spring, a pressure fluid energy accumulator might be connected with the conduit at the opening 17a.

In FIG. 5 of the drawings, the present invention is illustrated as incorporating a plurality of valve actuators 10, each actuator employing a housing 9 including cylindrical end portions 17 and a central housing portion 11 constructed in a manner as previously described. It will be noted that the housings 9 are stacked vertically and suitable means such as elongated bolts 60 are engaged so as to hold the portions 11a and 11b of each of the housings 9 interconnected.

Figure 6:
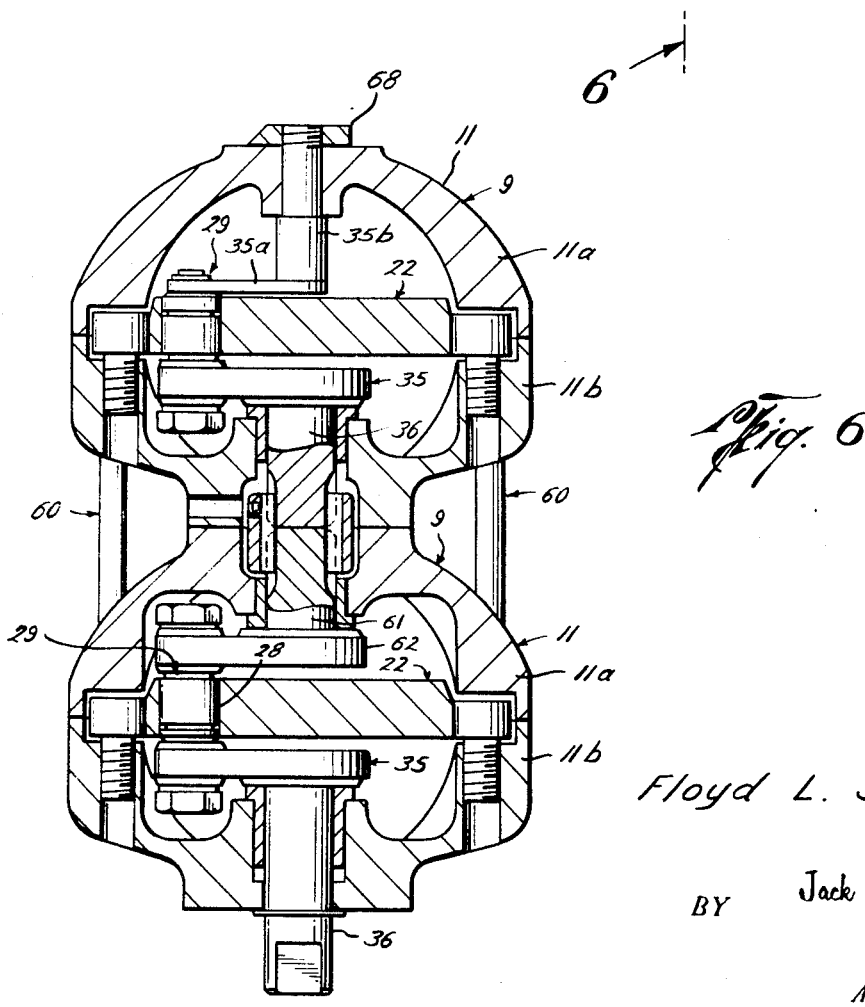
FIG. 6 is a sectional view on the line 6—6 of FIG. 5 illustrating structural details of the stacked housing arrangement shown in FIG. 5.

The structure and function of this form of the invention is the same as that previously described except the power of the valve actuator may be increased by coupling the actuators together to thereby deliver more torque. This is done by coupling the crank arms of the two together so that they move in unison as fluid power is supplied through the ports 16a and 17a to move the cam carrier 22 in each actuator. For example, the crank arm 35 of one of the pair of actuators is shown as being connected by its shaft 36 with a shaft 61 extending through 11a and integrally connected with the crank arm 62. The crank 62 is, in turn, connected to the cam follower 29 that abuts against the cam surface 28 and with which the crank arm 35 in the other or lowermost housing 9 is connected. It is contemplated that the carrier means 22 of each of the valve actuators shown in FIG. 6 will move in unison, and the resulting torque will be applied through the output shaft 36 and to a valve stem connected therewith.

In order to indicate the position of the valve, that is, either in open or closed position at all times, the crank arm 35a in both forms of the invention shown is connected with the cam folower 29 as previously described. The arm 35a is, in turn, integrally connected with a shaft 35b which extends out the top of the housing. The shaft 35b is provided with a suitable pointer or indicator as referred to at 68 to indicate the position of the cam follower 29 in relation to the cam surface 28, thus indicating whether the valve is in open or closed position.

The foregoing disclosure and description of the invention are illustrative and explanatory thereof, and various changes in the size, shape, and materials as well as in the details of the illustrated construction may be made without departing from the spirit of the invention.

What is claimed is:
1. A valve actuator comprising:
   a. a housing;
   b. a plate having cam surface means therein reciprocably supported in said housing;
   c. piston means connected to each end of said plate and slidable within said housing for reciprocation of said plate;
   d. said cam surface means comprising an S-shaped slot formed by mutually tangent circular arcs in the plane of said plate the ends of said slot extending in a generally axial direction along the path of piston reciprocation;
   e. rotatable bearing means between said housing and said plate and engaging said plate on each side at spaced intervals therealong to provide lateral support for said plate;
   f. cam follower means for abutting the slot in said plate;
   g. crank arm means connected with said cam follower means;
   h. means for connecting said crank arm means with a valve stem so that reciprocation of said plate in said housing causes said cam follower to move along the slot and rotate said crank arm means and valve stem; and
   i. indicator means connected with said crank arm means and supported in said housing to indicate the position of said cam follower means in relation to the slot.

* * * * *

UNITED STATES PATENT OFFICE
CERTIFICATE OF CORRECTION

Patent No. 3,753,386            Dated August 21, 1973

Inventor(s) Floyd L. Scott, Jr.

It is certified that error appears in the above-identified patent and that said Letters Patent are hereby corrected as shown below:

Col. 2, Line 12 - insert "present" before invention

Signed and sealed this 19th day of March 1974.

(SEAL)
Attest:

EDWARD M. FLETCHER, JR.       C. MARSHALL DANN
Attesting Officer              Commissioner of Patents